Dec. 14, 1954 J. PHYL 2,696,895
APPARATUS FOR SEPARATING SUSPENDED MATERIALS FROM GAS
Filed Aug. 25, 1952 3 Sheets-Sheet 1
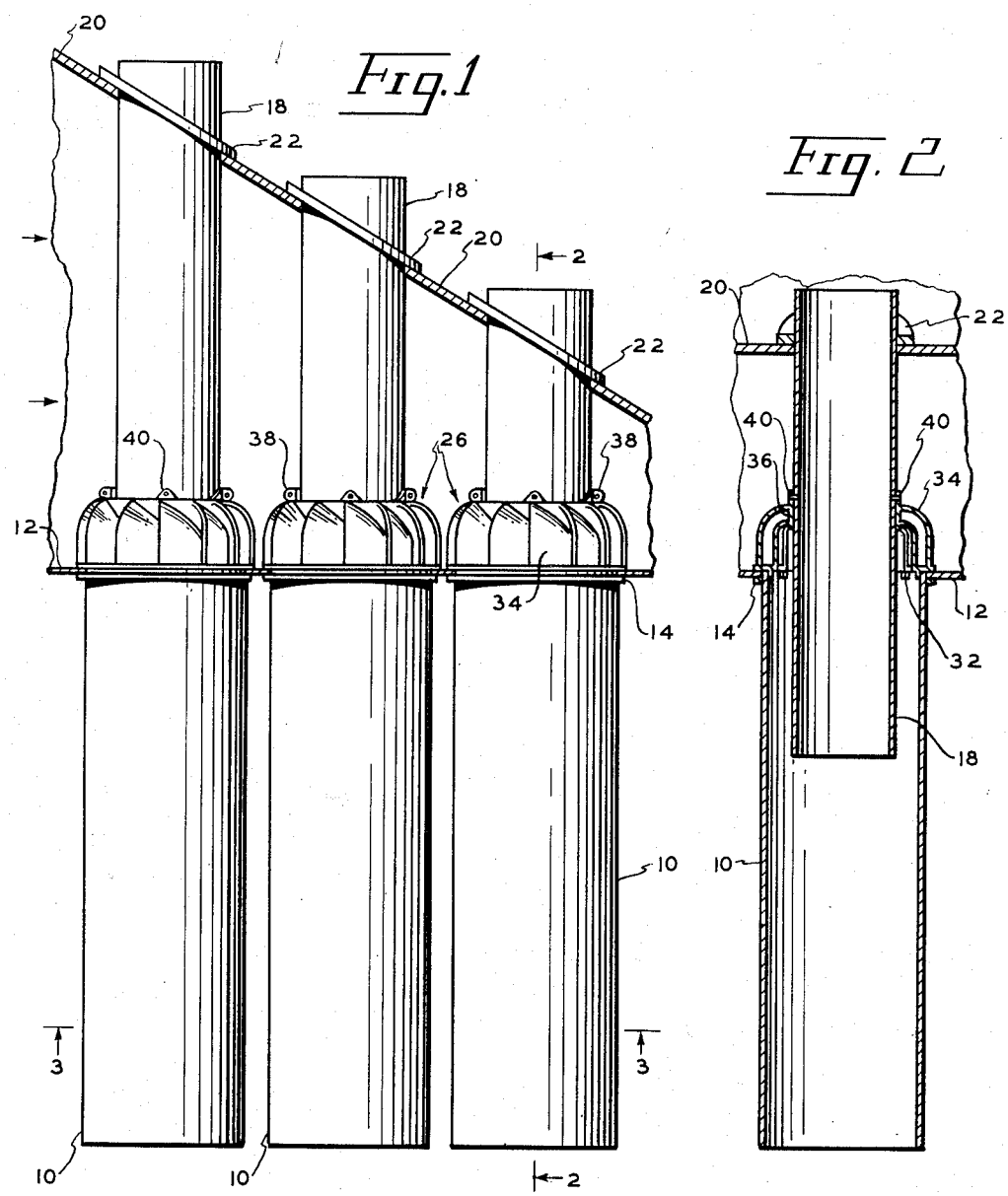
INVENTOR
JOSEPH PHYL
BY *Harold T. Stowell*
ATTORNEY INVENTOR
JOSEPH PHYL
BY Harold T. Stowell
ATTORNEY Dec. 14, 1954 J. PHYL 2,696,895
APPARATUS FOR SEPARATING SUSPENDED MATERIALS FROM GAS
Filed Aug. 25, 1952 3 Sheets-Sheet 3
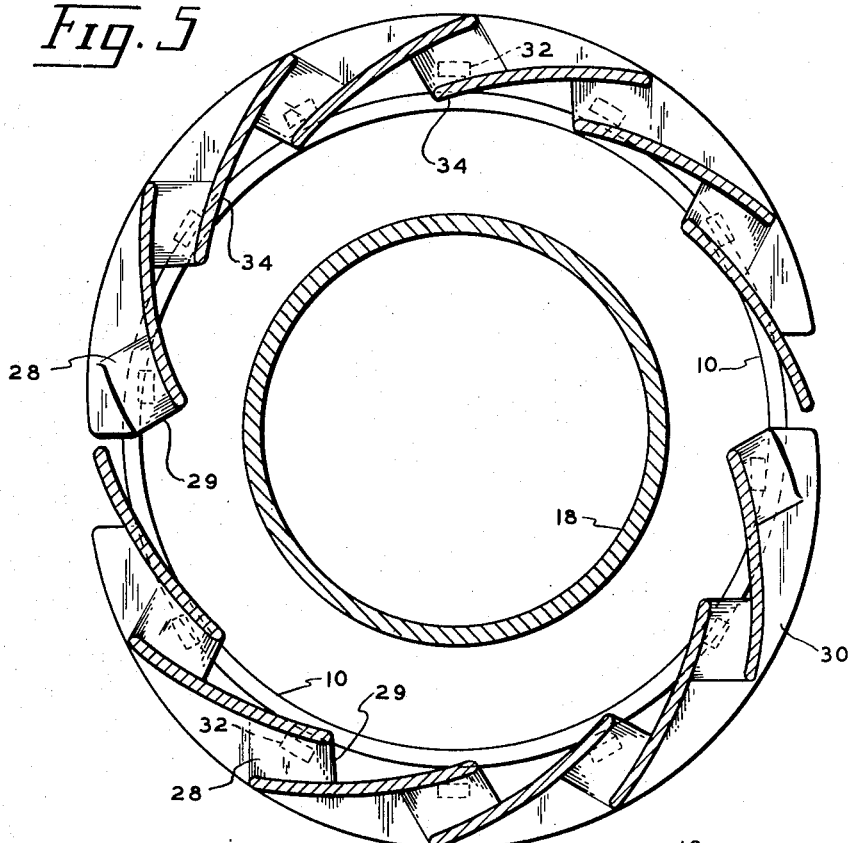
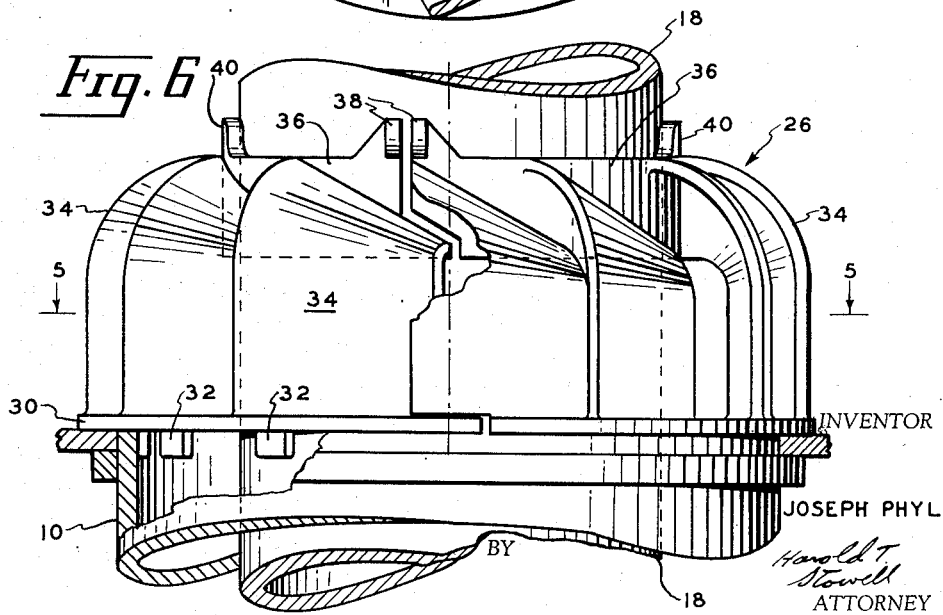
INVENTOR
JOSEPH PHYL
BY
Harold T. Stowell
ATTORNEY

United States Patent Office 2,696,895
Patented Dec. 14, 1954

2,696,895

APPARATUS FOR SEPARATING SUSPENDED MATERIALS FROM GAS

Joseph Phyl, Fanwood, N. J., assignor to Research Corporation, New York, N. Y., a corporation of New York Application August 25, 1952, Serial No. 306,077

5 Claims. (Cl. 183—81)

This invention relates to an improved apparatus for centrifugally separating suspended particles from a gaseous medium, and more particularly to new and improved gas spinning means for centrifugal dust collectors commonly known as "cyclone separators."

In general the apparatus of the invention is useful for separating suspended material from a stream of gas by centrifugal action. It comprises a plurality of separating units in which the particle-laden gas is whirled to separate the particles from the gas and means for separately withdrawing the gas and the suspended particles.

In the use of such centrifugal separators it is necessary periodically to remove the gas spinning means for repair and cleaning. This is particularly necessary in power house installations in periods when fuel oil is substituted for solid fuel, as it has been found that when fuel oil is being burned heavy incrustations accumulate on the vanes of the spinning means which substantially increase the pressure drop across the cleaner and which eventually reduce the gas flow.

It is, therefore, a primary object of the present invention to provide centrifugal gas cleaning devices with separable gas spinnning means which are readily accessible for repair and cleaning without disassembling the gas separating and gas discharge tubes.

A further object is to provide such a device with means for reducing the wear on the separating tubes from the entering suspended material.

Another object is to provide such a device having substantially higher efficiencies than previously known centrifugal separators.

These and other objects and advantages are obtained with the improved apparatus for centrifugally separating suspended particles from a gaseous medim which generally comprises a header plate having a plurality of apertures therethrough, elongated tubular separating units engaging said header plate at each aperture, a closure plate spaced from the header plate having apertures coaxial with those of said header plate, a gas outlet tube for each separating unit mounted in said closure plate and projecting axially into its corresponding separating unit to form an annular passage therein, and an annular gas inlet head carried by said header plate at the end of each annular passage nearest the closure plate, said gas inlet head comprising an annular flange member extending radially over the end of the tubular separating unit, a cylindrical collar member surrounding the gas outlet tube and in contact therewith and a plurality of spaced helical vane members extending from the face of the flange member nearest the closure plate to the outer face of the collar member to define a plurality of helical gas passages.

The invention will be more particularly described with reference to the illustrative embodiments of invention shown in the accompanying drawings in which:

Fig. 1 is a fragmentary elevational view in partial section of a group of centrifugal separators of the invention;

Fig. 2 is a vertical sectional view on line 2—2 of Fig. 1;

Fig. 5 is a view substantially along line 5—5 of Fig. 6 with the two half sections of the gas spinning means slightly separated to show more clearly the separation line of the half sections; and Fig. 6 is an enlarged fragmentary elevational view of the gas spinning means shown in Fig. 1 with portions broken away for clarity.

Figure 3:
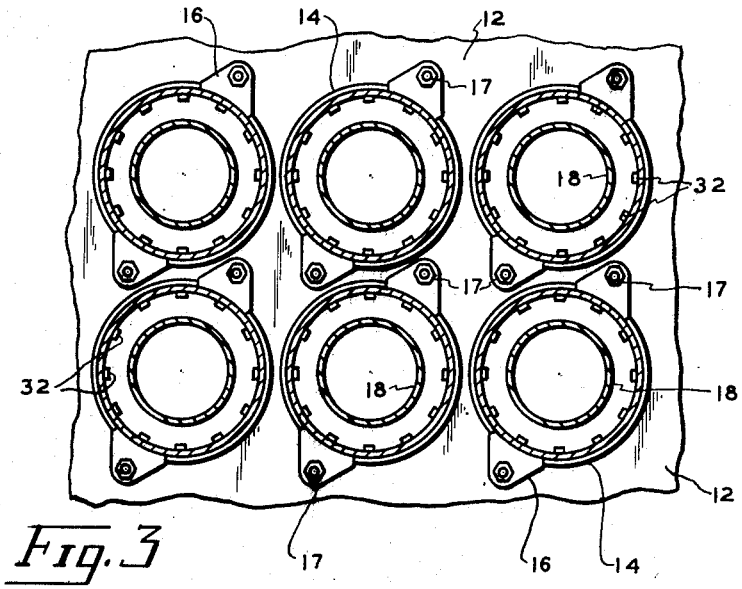
Fig. 3 is a horizontal sectional view on line 3—3 of Fig. 1.

With reference to the drawings and in particular to Figs. 1 through 3, there is shown a preferred form of an apparatus for separating suspended material from a stream of gas by centrifugal action comprising a plurality of open-ended tubular separating units 10 of generally circular cross-section arranged vertically in a header plate 12. The header plate is provided with a plurality of circular openings into each of which a separating tube extends so that its upper peripheral edge is substantially flush with the upper side of the plate. A circular boss 14 is secured, for example, by welding, just below the upper edge of each separator tube. This boss is adapted to engage the lower surface of the header plate and the separator tubes are held against this surface by a pair of clamps 16, the clamps being bolted to the header plate 12 by bolts 17 as shown in Fig. 3 of the drawings.

Concentrically disposed within a portion of the upper end of each of the separating units is a clean gas outlet member 18. The outlet members like the separating units 10 are preferably circular in cross-section and extend above the units 10 and through an inclined partition or closure plate 20. A boss 22, similar to boss 14, is secured to each outlet tube and positioned to engage the upper surface of the inclined partition plate 20.

Clamps, not shown in the drawings, but similar to clamps 16, secure the boss to the inclined partition plate.

The gas containing suspended material is supplied to the separating units in the direction shown by the arrows in Fig. 1 of the drawings, between header plate 12 and the inclined partition 20. The clean gas discharges above the plate 20 while the separated suspended material from the gas stream is collected below the header plate 12.

At the inlet end of each separating unit 10 the gas and suspended material are whirled to subject them to centrifugal action by the gas spinning means 26.

Figure 4:
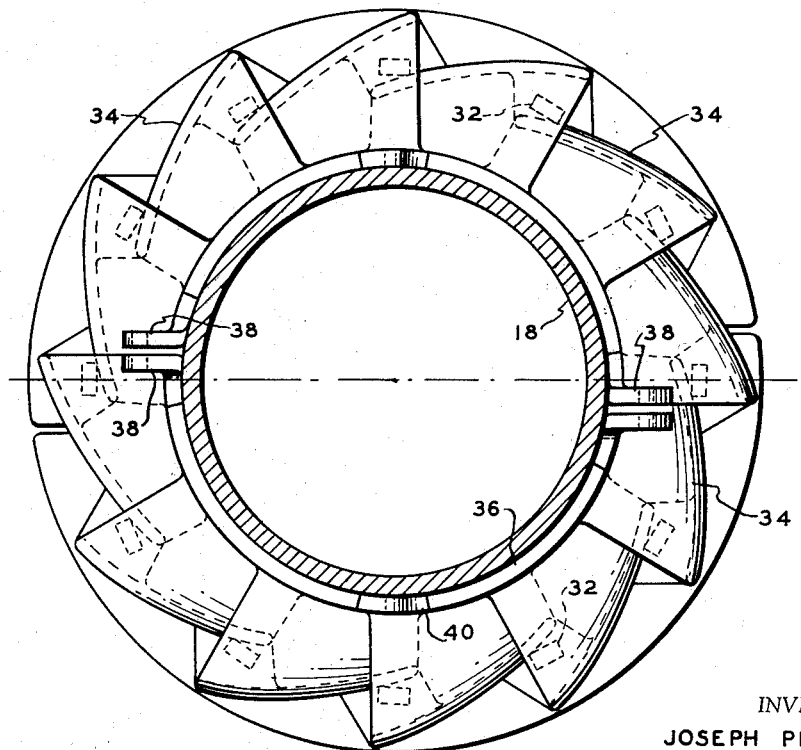
Fig. 4 is an enlarged top plan view of one of the gas spinning means for the separating tubes.

The gas spinning means 26, as more clearly shown in Figs. 4, 5, and 6, comprises a cast intake head preferably made in two sections for ease of assembly and disassembly. The intake head has a substantially plane circular outer flange 30 having a larger radius than that of the separator units. This flange is adapted to engage the upper surface of the header plate 12 and is positioned co-axially with the separator units by a plurality of depending lugs 32 which are positioned about the flange 30 on a radius slightly less than the internal radius of the separator tubes. Thus when the intake head is positioned at the gas inlet end of the separator tube lugs 32 snugly engage the inner wall of the separator tube and prevent lateral shifting of the intake head.

Projecting generally upwardly and inwardly from flange 30 are a plurality of helical vanes 34, the upper inwardly directed ends of which merge into collar member 36. The vanes cooperate with each other and with flange 30 to provide a plurality of spiral passages forming a gas spinning inlet head. As is more clearly shown in Fig. 4, each vane 34 extends into overlapping relationship with the adjacent vanes. The flange 30 extending inwardly of the separator tube 10 protects the upper portion of the tube from excessive abrasion by the suspended particles. The flange 30 has extensions 28 providing base portions extending inwardly along the lower edges of the vanes 34 and cooperating with the vanes to define a plurality of gas passages extending helically inwardly and decreasing in area from the gas inlet to the gas outlet end thereof. The upper surface of the portions 28 of the flange 30, which are located between the overlapping adjacent vanes, is sloped gradually downwardly to form a thin discharge lip 29 as indicated in Fig. 4 of the drawings.

The collar members 36 have an inside diameter substantially equal to the outside diameter of the discharge tubes 18 so that a snug fit exists between the collar and the discharge tubes.

In order to facilitate removal of the gas inlet head, without disassembling the gas separation and discharge tubes, each inlet head is preferably cast in at least two parts, each of which is substantially a vertical section through the inlet head, with the plane of separation following the slope lines of diametrically opposite vanes. Thus, since each successive vane overlaps a portion of its preceding vane, the separation of the inlet head does not substantially reduce the structural strength of the vanes adjacent the plane of separation.

Paired radially extending lugs 38 are provided at the adjacent edges of each sector of the collar member 36 through which bolts, not shown in the drawings, are inserted to hold the two sections of the inlet head together and snugly against the outer surface of the gas discharge tubes 18.

At the upper edge of each sector of the collar member 36 there may be provided a lug 40 which is bored to receive a fastener such as a metal screw or bolt so that each section of the inlet head may be separately secured to its outlet tube.

In operation a gas stream carrying suspended material enters the gas separating device between the header plate 12 and the inclined plate 20. The gas stream flows downwardly between the vanes 34 of the inlet heads 26 whereby the gas and suspended material are whirled and spun. The spinning gas throws the suspended material outwardly against the interior surfaces of the separator tubes 10 from which they drop through the separator tubes into dust receiving chambers positioned below the tubes 10. The dust-free gas passes through the gas outlet tubes 18 into the space above the inclined plate 20. Suitable gas outlet ducts may be provided to direct the passage of the clean gas from the space above the outlet tubes 18.

From the foregoing description it will be seen that the present invention provides a new and improved apparatus for centrifugally separating suspended particles from a gas stream whereby the aims, objects and advantages of the invention are fully accomplished.

It will be evident that various modifications may be made in the construction and form of the inlet head, and separator and discharge tubes. For example, while the gas spinning inlet head has been described as cast in two sections, the head may be formed in three or more sections and portions may be separated along radial or tangented planes which follow the slope line of diametrically opposite planes. It is further evident that while a cast inlet head has been shown, the inlet head may be fabricated from separately cast or stamped vanes and rings.

I claim:

1. An apparatus for separating suspended material from a stream of gas by centrifugal force comprising a header plate having a plurality of apertures therethrough, elongated tubular separating units engaging said header plate at each aperture, a closure plate spaced from the header plate having apertures coaxial with those of said header plate, a gas outlet tube for each separating unit mounted in said closure plate and projecting axially into its corresponding separating unit to form an annular passage therein, and an annular gas inlet head carried by said header plate at the end of each annular passage nearest the closure plate, said gas inlet head comprising an annular flange member positioned co-axially with the tubular separator unit, said annular flange having a larger outside diameter than the tubular separating unit and adapted to engage the upper surface of said header plate, a cylindrical collar member surrounding the gas outlet tube and in contact therewith above the upper face of said annular flange, a plurality of spaced vane members extending generally upwardly and inwardly from the upper face of said annular flange, the upper inwardly directed ends of said spaced vane members being connected to the outer face of the collar member, each successive vane member overlapping a portion of its preceding vane member, said annular flange having extensions providing base portions extending inwardly along the lower edges of said vane members and cooperating with said vane members to define a plurality of gas passages extending helically inwardly and decreasing in area from the gas inlet to the gas outlet end thereof.

2. An apparatus as defined in claim 1 wherein the annular gas inlet head comprises at least two radially separable portions.

3. An apparatus as defined in claim 2 wherein the portions of the inlet head are separated along radial planes which follow the slope line of diametrically opposite vane members.

4. A spinner head for a centrifugal separator comprising a radially extending annular flange member, a cylindrical collar member having an outside diameter substantially smaller than the inside diameter of the flange member and spaced axially therefrom, a plurality of spaced vane members extending generally upwardly and inwardly from the upper face of said annular flange, the upper inwardly directed ends of said spaced vane members being connected to the outer face of the collar member, each successive vane member overlapping a portion of its preceding vane member, said annular flange having extensions providing base portions extending inwardly along the lower edges of said vane members and cooperating therewith to define a plurality of gas passages extending helically inwardly and decreasing in area from the gas inlet to the gas outlet end thereof.

5. An apparatus as defined in claim 4 wherein the annular gas inlet head comprises at least two separable portions separated along planes which follow the slope line of diametrically opposite vane members.

References Cited in the file of this patent

UNITED STATES PATENTS

| Number | Name | Date |
|---|---|---|
| 630,023 | Baker | Aug. 1, 1899 |
| 2,433,774 | Madely | Dec. 30, 1947 |
| 2,544,395 | Polk | Mar. 6, 1951 |
| 2,565,902 | Wright et al. | Aug. 28, 1951 |

FOREIGN PATENTS

| Number | Country | Date |
|---|---|---|
| 580,616 | Great Britain | Sept. 13, 1946 |
| 892,950 | France | Jan. 17, 1944 |